United States Patent [19]

Truett

[11] Patent Number: 5,035,938
[45] Date of Patent: Jul. 30, 1991

[54] TRIM STRIP PROTECTOR

[76] Inventor: Brett B. Truett, 1902 Briar Ave., Utica, N.Y. 13501

[21] Appl. No.: 495,703

[22] Filed: Mar. 19, 1990

[51] Int. Cl.⁵ .............................................. B60R 13/00
[52] U.S. Cl. .................................... 428/122; 150/166; 296/136; 428/358
[58] Field of Search ........................ 150/166; 296/136; 49/462; 428/122, 358

[56] References Cited

U.S. PATENT DOCUMENTS

| | | | |
|---|---|---|---|
| 2,564,386 | 8/1951 | Webb | 428/122 X |
| 2,887,338 | 5/1959 | Adell | 428/122 X |
| 3,359,030 | 12/1967 | Newman | 428/31 X |
| 3,396,838 | 8/1964 | Hawthorn | 428/31 X |
| 3,416,282 | 12/1968 | Daugherty | 428/358 X |
| 3,549,448 | 10/1967 | Dearing | 428/76 X |
| 3,620,796 | 1/1969 | Gordy | 428/31 |
| 4,350,550 | 9/1982 | Van Manen | 428/31 X |
| 4,499,130 | 2/1985 | Questel et al. | 428/42 |
| 4,548,838 | 10/1985 | Sunohara | 472/282 |
| 4,578,281 | 3/1986 | Ebisawa | 427/282 X |
| 4,581,807 | 4/1986 | Adell | 428/31 X |
| 4,682,442 | 7/1987 | Adell | 428/31 X |
| 4,734,312 | 3/1988 | Sugiyama | 428/31 X |
| 4,759,959 | 7/1988 | Guy | 427/282 |
| 4,844,005 | 7/1989 | Filomeno | 150/166 X |
| 4,943,226 | 7/1990 | Pottorff | 428/122 X |

*Primary Examiner*—Henry F. Epstein
*Attorney, Agent, or Firm*—Wall and Roehrig

[57] ABSTRACT

A kit is provided which has a number of protective covers of a generally U-shaped cross section to be frictionally snapped about the decorative molding, trim, or other component of an automobile, to protect the textured decorative trim components from an application of wax when the car is waxed, for protection and beautification. Additional plastic protection covers are provided for door handles, antenna well, and similar components where the introduction of wax or other foreign material would adversely affect the appearance and/or performance of the component.

7 Claims, 4 Drawing Sheets

TRIM STRIP PROTECTOR

BACKGROUND OF THE INVENTION

This invention relates to protective cover members for vehicles, and more particularly to a kit of a plurality of reusable protective cover members for protecting decorative trim and the like on a vehicle.

In today's society, it is common to protect expensive vehicles and the like with a protective wax coating to preserve and enhance the finish and decorative appearance of the vehicle. On many cars and boats, decorative trim and other accessories are applied which have a different surface, appearance and finish than the main portion of the vehicle and it is frequently desirable to not wax these textured decorative portions because the wax will tend to build up in an unsightly fashion and will also tend to fill in the textured surface of the decorative trim or other accessary. Also under certain conditions, some accessories and trim items on a vehicle can be adversely affected by the beautifying and protective wax used on the main surface of the vehicle.

OBJECTS AND SUMMARY OF THE INVENTION

Accordingly, it is an object of the present invention to provide a kit of reusable protective cover members that can be selectively used to protect textured, decorative trim components and other selected components of a vehicle from waxing when the entire vehicle is being covered with wax.

It is another object of the present invention to provide a kit of flexible plastic protective cover members that can be quickly and easily snapped in place over selected decorative components to protect them from a coat of wax when the rest of the vehicle is waxed.

It is a further object of the present invention to provide a kit of multiple protective cover members for use in preventing application of a wax coating to selected trim components of a vehicle that can be removed and reused after waxing.

It is a still further ojbect of the present invention to provide a reusable protective cover member kit for eliminating the need to remove unsightly wax deposits on textured decorative trim components of a vehicle.

It is yet another object of the present invention to provide a kit of a plurality of reusable protective cover members for selected trim components of vehicles to speed up the protective waxing process of the entire vehicle.

In one embodiment of the invention, a plurality of U-shaped cross section channels of a flexible plastic material are provided to form a kit from which a vehicle owner can selectively protect the textured trim and decorative components of an automobile or other vehicle from receiving a coat of wax when the entire vehicle is being given a protective and decorative coat of wax.

BRIEF DESCRIPTION OF THE DRAWINGS

The invention will become better understood from the following description, taken in conjunction with the drawings, in which.

DETAILED DESCRIPTION OF A PREFERRED EMBODIMENT

Figure 1:
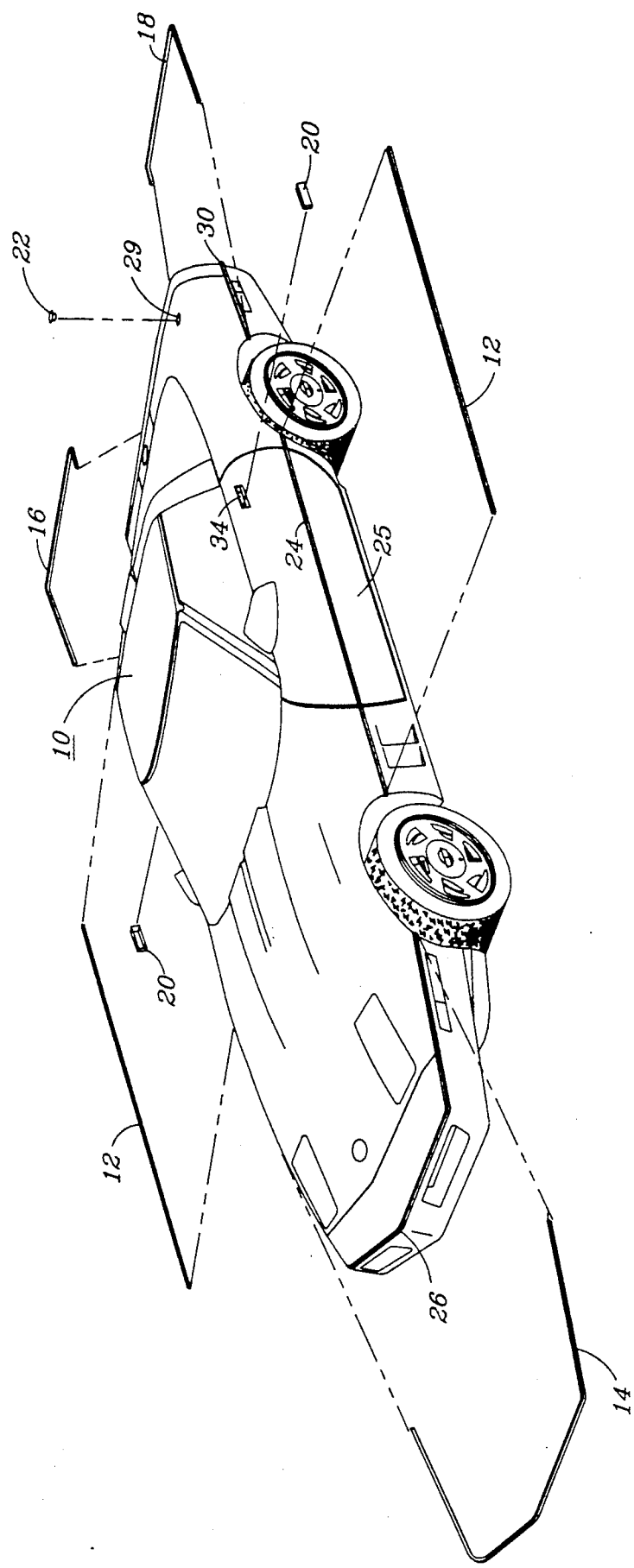
FIG. 1 is a perspective view of an automobile showing a kit of protective cover members in exploded detail, as they would be applied to the vehicle to protect the textured, decorative moldings.

Referring now to FIG. 1, there is shown in perspective an automobile 10 typical of the 1984—1990 models of a well-known make, together with a plurality of protective cover members 12 through 22 shown in exploded view, ready for application to a vehicle in preparation for waxing the vehicle.

Figure 2:
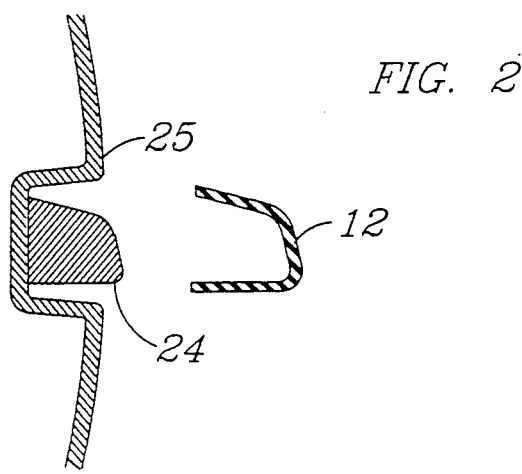
FIG. 2 is a cross-sectional view showing a protective cover and trim member in cross section.
Figure 3:
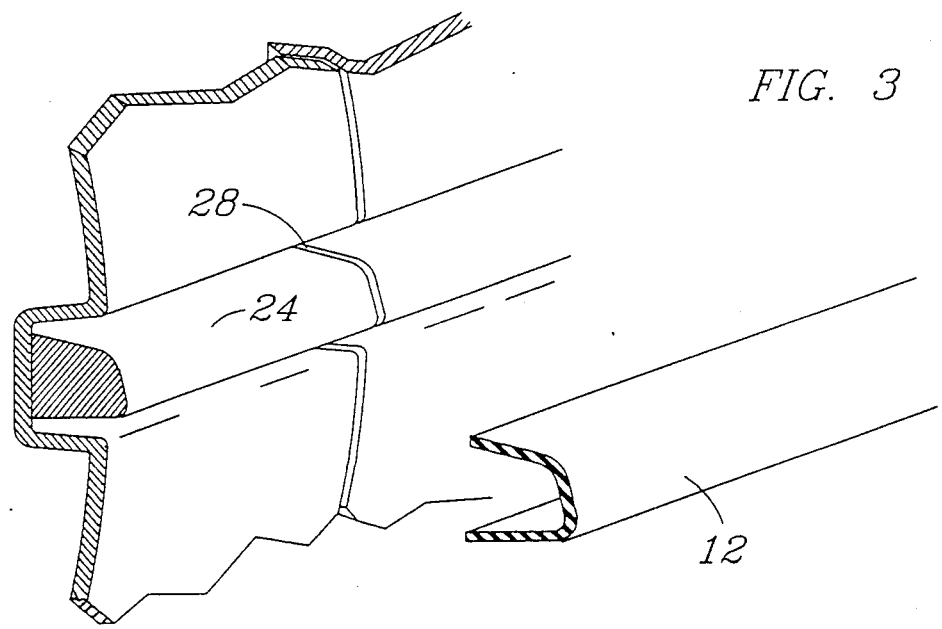
FIG. 3 is a partial exploded perspective view showing a preferred embodiment concealing the abutted ends of trim moldings at the intersection of two adjoining body panels.

As may be seen in FIG. 2, the channel 12 generally is of a U-shaped cross section patterned to fit snugly over the trim strip 24 which is secured in a partial indentation in the door 25, fender of other body portions of the vehicle. Trim strip 24 typically has a black textured surfaced (not shown) which traps wax in a unsightly fashion. The channels 12 through 18, in one embodiment are made of a resilient plastic material that frictionally snaps over the trim member 24 so as to prevent wax contacting the textured surface of the trim member 24. As may be seen in FIGS. 1 and 3, the channel will extend generally from the front part of the car to the rear, usually from wheel well to wheel well and extend over and protect the gap made by abutting trim members between adjoining panels. This thus protects not only the particular outer surface of the trim members 24, but also the end surfaces 28 where trim members 24 must meet at adjoining body panels of the vehicle. In a similar fashion, the U-shaped channel member 14 is confiqured to fit around the front end of the car to form a protective covering over the entire front portion of the decorative trim member 26, as can be seen more clearly in FIG. 1. Members 16 and 18 may be formed in a C-shaped configuration to fit around two rear portions of the vehicle from the rear edge of the wheel around the rear panel to a central dividing portion with a left and right hand member being provided to fully protect the decorative trim member 30 as it wraps around the rear of the vehicle.

Figure 4:
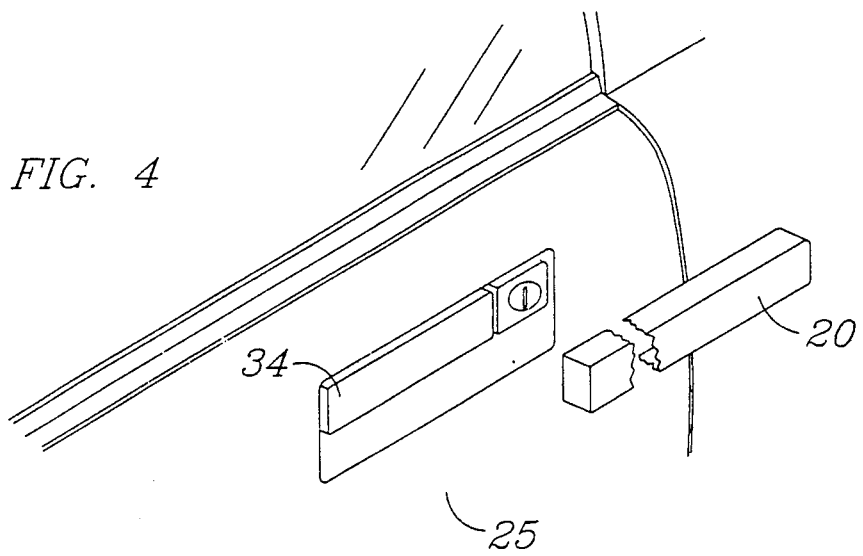
FIG. 4 is a perspective view of a protective cover member for a door latch.

As may also be seen in FIGS. 1 and 4, a small elongated five-sided box member 20 is provided to snap over the latch 34 on the door 25 to protect the texture and decorative appearance of the latch handle.

Finally, in usual vehicles of this type, there is a retracting radio antenna 29 which recesses into the rear fender and when recessed, leaves an opening which can become clogged with wax or other undersired debris during the waxing and polishing operation. Accordingly, a plug 22 is provided to close this opening and prevent undersired and unwanted wax or dust build-up during the polishing operation.

With the decorative trim members, 24, 26, 29, 30, and 34, protected by the cover members 12-22, the entire vehicle can be quickly and easily waxed in the usual manner without the difficulty of avoiding the trim members or of having to later remove the unwanted wax from the textured trim portions or from otherwise having to sufffer the consequences of the undesirable wax build-up on the textured surfaces which detracts from the appearance and value of the car.

Figure 5:
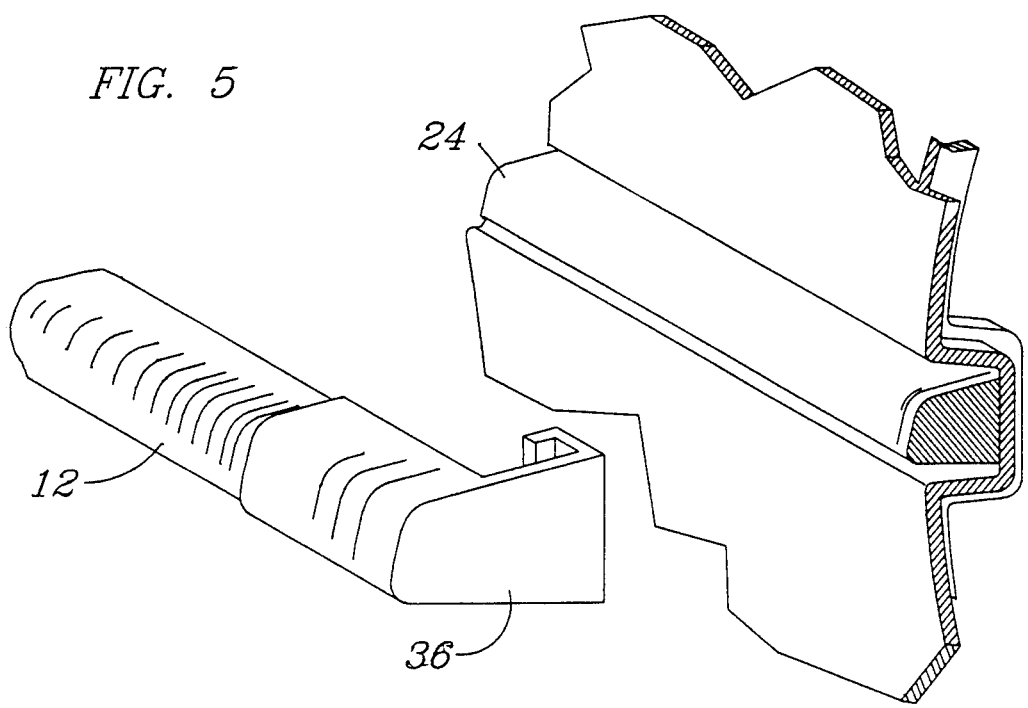
FIG. 5 is a partial perspective view showing an embodiment of an end clip for retaining the end of a flexible channel about a trim member.
Figure 6:
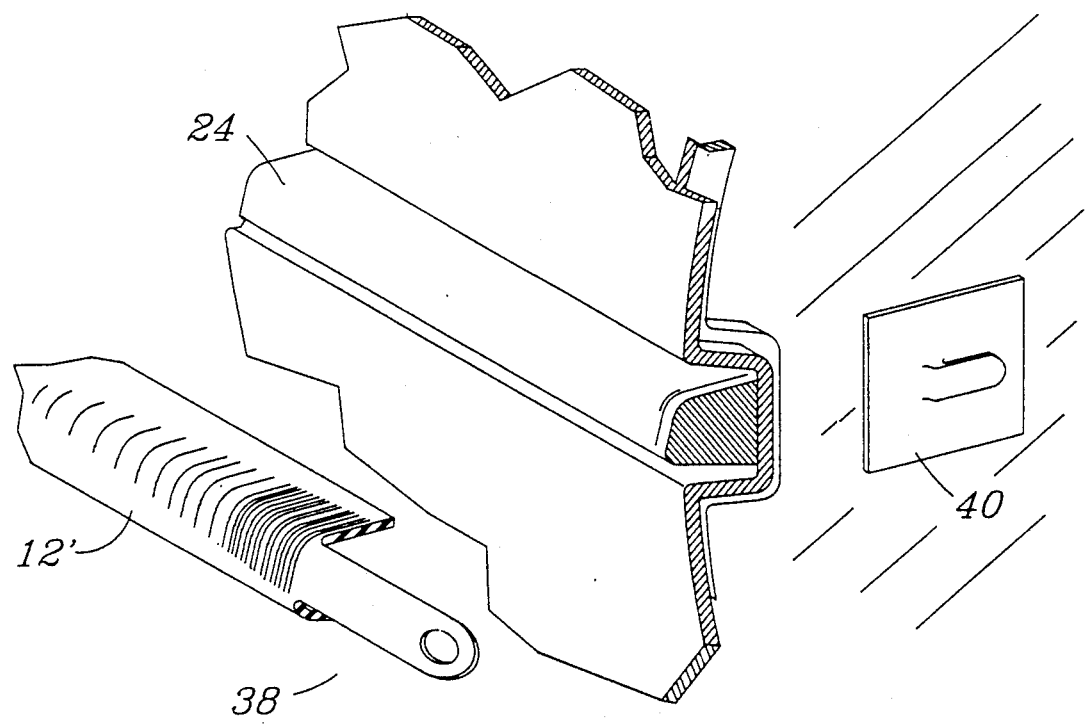
FIG. 6 is a view simlar to FIG. 5 showing another type of clip member for securing the end of a protective channel member about the trim component.

Referring now to FIG. 5, there is shown another embodiment of the present invention in which it is sometimes desirable to secure the protective cover member to the vehicle being waxed by end clip 36 which can clip around the edge of the wheel opening to securably hold the elongated cover members 14, 16 and 18 in place on the vehicle during waxing operations. In some situations, it is desirable to affix to the interior of the wheel well a special fastening clip 40, FIG. 6 so that an end tab 38 of the channel 12' may engage the clip 40 and securely hold the channel 12' in place.

Figure 7:
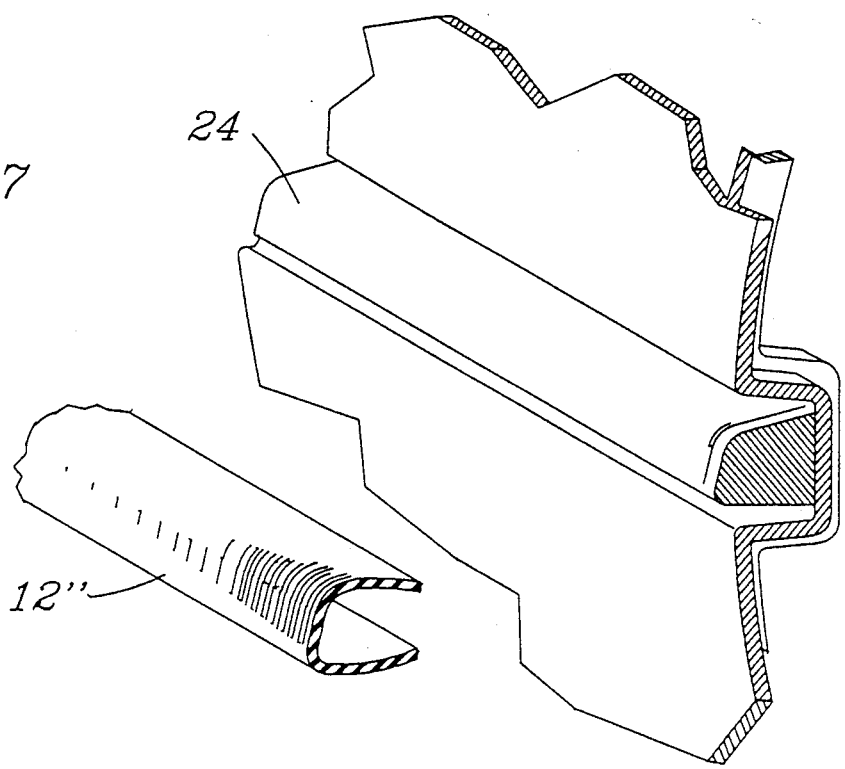
FIG. 7 is a perspective view partially in section of a protective U-shaped channel according to the present invention.

FIG. 7 shows the channel 12" being made of a resilient material adapted to snap over the trim 24 and frictionally engage the trim to fully protect it during waxing.

Figure 8:
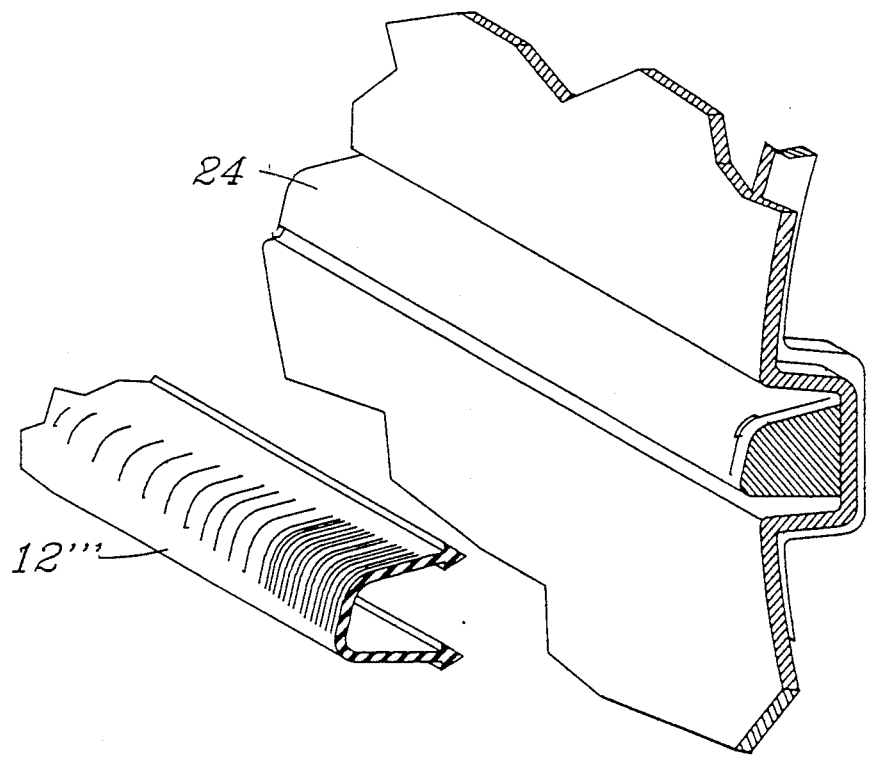
FIG. 8 is a view similar to FIG. 7 showing another embodiment of a flexible plastic channel for protecting a trim strip on a vehicle

Referring to FIG. 8, there is shown a still further embodiment of the present invention wherein the U-shaped channel 12''' has an integral part thereof, a pair of arrow shaped feet along the edges of the channel that permit the cover to be wedged into the grooves between the channel and the body, to securely hold the cover member 12''' in place about the trim portion 24. The arrow shaped legs of the U in this configuration would be made of a soft deformable material so as to frictionally engage in the slot and to allow a variety of types of trim members to be covered when recessed in various types of slots or indentations in the vehicle body.

With protective covers held in place by one of the foregoing embodiments it is a simple matter for the car owner to quickly and easily wax the entire car and buff it to a high gloss without getting any undersired wax on the selected trim components that would be adversely affected by wax thereto.

While the present invention has been shown as applied to a particular model, it should be understood by those skilled in the art that the protective cover members may be applied to other makes of cars, and vehicles, as well as to boats and other types of equipment where it is desirable to protect and beautify the device by repeated applications of wax products and certain decorative portions of the device are textured or otherwise unsuitable for application of wax.

While this invention has been explained with reference to the structure disclosed herein, it is not confined to the details as set forth and this application is intended to cover any modifications and changes as may come within the scope of the following claims.

What is claimed is:

1. A kit of protecting covering members for enclosing decorative textures trim strips on an automobile when waxing the finish to prevent unwanted wax material residue from building up on the trim strips which comprises in combination:
    a first pair of elongated reusable plastic channels having a generally U-shaped cross section;
    said first pair being adapted to extend substantially from the front wheel to the rear wheel well along a side of an automobile;
    a second pair of reusable plastic channels having a generally U-shaped cross section, each having a central portion and a leg member extending from each end of said central portion at substantially right angles thereto;
    said second pair of reusable channels being adapted to extend substantially around the front and rear ends of an automobile to protect decorative trim strips located between corresponding front and rear wheel wells;
    at least one pair of door handle reusable plastic cover members for protecting decorative trim portions of an automobile door handle; and
    at least one selected auxiliary reusable cover member adapted to cover a decorative trim member on an automobile so that an automobile owner may apply the reusable plastic channels and cover members to an automobile whenever waxing the automobile finish, to prevent unwanted application of wax to the trim strips.

2. The kit according to claim 1, wherein said channels comprise a thin, flexible sheet plastic material formed to snap over and frictionally engage the trim member to be protected.

3. The kit according to claim 2, wherein said sheet material comprises a polyvinyl chloride material.

4. The kit according to claim 1 wherein each of said channels include a fastener clip at each end thereof adapted to engage a portion of the vehicle to be protected.

5. The kit according to claim 4 wherein said fastener clip comprises a tab portion on each end of said channels, and a mating clip member secured to said vehicle.

6. The kit according to claim 1 wherein said U-shaped cross-section channels comprises a resilient plastic material with arrow shaped feet disposed along the tip of each leg of the "U" so that said channel may be frictionally engaged in a narrow groove adjacent the trim to be covered.

7. The kit according to claim 1 wherein said first pair of channels extend from a forward opening to a rearward opening in said vehicle and said second pair of channels extend from said forward openings around the front end of the vehicle to a corresponding forward opening and from said rearward openings around the rear end of said vehicle to a corresponding rearward opening.

* * * * *